United States Patent [19]

Boyko

[11] Patent Number: 4,813,292

[45] Date of Patent: Mar. 21, 1989

[54] MECHANICAL DRIVE WITH MULTI-PLY TAPE

[75] Inventor: James G. Boyko, Gorham, Me.

[73] Assignee: Maxaxam Corporation, Dover, Del.

[21] Appl. No.: 117,193

[22] Filed: Nov. 4, 1987

Related U.S. Application Data

[63] Continuation-in-part of Ser. No. 936,276, Dec. 1, 1986, abandoned.

[51] Int. Cl.$^4$ ................................................ F16G 9/00
[52] U.S. Cl. ...................................... 74/89.2; 74/108; 74/517
[58] Field of Search ................... 74/89.2, 89.21, 89.22, 74/108, 517

[56] References Cited

U.S. PATENT DOCUMENTS

| | | | |
|---|---|---|---|
| 1,405,852 | 2/1922 | Maag et al. | 74/108 |
| 1,935,806 | 11/1933 | Mautsch | 74/89.2 |
| 1,982,394 | 11/1934 | Morris | 74/25 |
| 2,916,922 | 12/1959 | Sorensen | 74/108 |
| 2,920,494 | 1/1960 | Dodwill | 474/84 |
| 3,003,357 | 10/1961 | Votta | 74/89.2 |
| 3,267,812 | 8/1966 | Hunkeler | 74/89.2 |
| 3,572,141 | 3/1971 | Wilkes | 74/89.22 |
| 3,604,283 | 9/1971 | Van Doorne | 474/8 |
| 3,614,898 | 10/1971 | Paine | 74/89.2 |
| 3,777,577 | 12/1973 | Giacomello et al. | 74/89.22 |
| 3,828,615 | 8/1974 | O'Connor | 74/89.22 |
| 3,889,545 | 6/1975 | Baublys et al. | 474/205 |
| 4,332,575 | 6/1982 | Hendriks | 474/201 |
| 4,365,764 | 12/1982 | Marx | 74/89.2 |
| 4,391,155 | 7/1988 | Bender | 74/89.2 |
| 4,419,707 | 12/1983 | Woodier | 74/89.2 |
| 4,537,084 | 8/1985 | Passemard et al. | 74/89.22 |

OTHER PUBLICATIONS

Design of Machine Elements, Third Edition, M. F. Spotts, Prentice-Halls, Inc., Englewood Cliffs, N.J., Aug. 1961, pp. 243–244.

Primary Examiner—Leslie A. Braun
Assistant Examiner—Scott Anchell
Attorney, Agent, or Firm—Lerner, David, Littenberg, Krumholz & Mentlik

[57] ABSTRACT

A tape-type mechanical drive including a flexible but substantially inextensible tape connected between two elements so that the tape transmits forces in tension. The tape includes a plurality of plies, disposed in two runs, and an equalizing device is provided for maintaining the plies under equal tension as the curvature of the tape changes. The plies in each run remain substantially parallel to one another. The tape may be formed from a single continuous strap folded to define a plurality of spiral turns.

29 Claims, 5 Drawing Sheets

MECHANICAL DRIVE WITH MULTI-PLY TAPE

CROSS-REFERENCE TO RELATED APPLICATIONS

The present application is a continuation in part of U.S. patent application No. 936,276 filed Dec. 1, 1986 now abandoned.

BACKGROUND OF THE INVENTION

The present invention relates to mechanical drives of the type commonly referred to as "strap" or tape drives.

Tape drives have been employed heretofore in various mechanical devices. Such drives typically incorporate a drum and a flexible but substantially inextensible, thin, metallic tape having one end fixed to the drum. The opposite end of the tape is fixed to another element arranged for reciprocating or pivoting motion. As the drum pivots about a drum axis, the tape is wound onto the circumferential surface of the drum, and the tape pulls the other element. Because one end of the tape is positively mounted to the drum and the opposite end of the tape is positively mounted to the other member, these devices do not depend upon frictional interengagement between the tape and the drum. Accordingly, devices of this nature are capable of providing a precise, repeatable linkage between the drum and another mechanical element. As disclosed, for example, in U.S. Pat. No. 3,614,898, this other element may be arranged for translational movement, and the system may be arranged to that the drum is the driven element rather than the driving element. Also, two tapes, extending in generally opposite directions from the drum to the other element can be employed to provide positive linkage in both directions of movement. Generally similar tape drives are disclosed in U.S. Pat. Nos. 4,419,707 and 3,267,812.

Tape drives offer considerable advantages of simplicity, precision, silent operation and the like. However, the load carrying capacity of tape drives heretofore has been limited by certain apparently inherent design considerations. As the metallic tape must flex as it winds onto the drum surface, the tape must be thin to minimize bending stress. The single tape thickness typically cannot be increased to provide increased load carrying capacity without also increasing the radius of the drum and hence increasing the size of the device. The most typical approach to this problem heretofore has been to place multiple thin tapes side-by-side on a drum, as shown for example in U.S. Pat. No. 1,405,852, or to provide auxiliary driving elements, such as frictionally engaged elements, as shown in the aforementioned U.S. Pat. No. 3,267,812. Neither of these provides a truly satisfactory solution, inasmuch as frictional elements are subject to slippage and wear, and multiple tapes disposed in a side-by-side arrangement require a wider drum, thereby also increasing the size of the device.

As illustrated in U.S. Pat. No. 2,916,922, attempts have been made heretofore to solve these problems by using a doubled tapes, having two superposed plies. Thus, in the '922 patent, a single elongated strap is folded double to make two plies, engaged with a rotary drum and fastened thereto, adjusted to have equal tension in both plies and then firmly clamped both to the rotary drum and to a slidable element. Because each individual ply is relatively thin, bending loads are substantially alleviated, and the device therefore can be relatively compact.

However, in a device as illustrated in the '922 patent, only one ply of the tape performs any useful function, and the remaining ply is essentially useless. The two plies of U.S. Pat. No. 2,916,922 tape can be under equal tension only at one point in the range of motion in the device. At all other points in the range of motion, substantially all of the load will be carried by only one of the plies. This is so because, in a device as shown in U.S. Pat. No. 2,916,922 patent, unequal lengths of the two plies are wound onto and off of the drum as the drum pivots. The outer tape, remote from the drum surface is effectively wound onto the outer surface of the inner ply and hence is effectively wound onto a larger drum than the inner ply. For example, where both plies of a tape are fastened at one point to a drum of radius R, and each ply has an individual ply thickness T, the inner ply resting directly on the drum surface will be pulled through a distance equal to $(A) \times (R)$ upon pivoting of the drum through an angle of A radians, whereas the outer ply will be pulled through a distance equal to $(A) \times (R+T)$ during the same pivoting motion. Accordingly, the relative degree of tension in the plies changes as the drum pivots. Even if the two plies are initially adjusted to equal tension at one point in the range of motion, one of the two plies will be substantially slack at every other point.

The problem of unequal tension in the plies of a multi-ply tape is discussed in U.S. Pat. No. 1,982,394. U.S. Pat. No. 1,982,394 employs a multi-ply tape as a guide or motion-transmitting element in an internal combustion engine. In one arrangement (FIGS. 36 and 37 of U.S. Pat. No. 1,982,394 patent) the plies of a multi-ply tape extend around a drum and from the drum to a free end. At the free end, each ply is connected to a separate slidable block, and the slidable blocks in turn are linked to a machine element by a system of further tapes and pivoting elements. Longitudinal forces or tension in the tape can be transmitted through the blocks, to the frame of the machine, but differences in tension of the individual plies can be equalized by sliding movement of the blocks. This arrangement requires a great multiplicity of complex and costly parts, and requires individual fastening of each ply to the corresponding slidable block. Another arrangement disclosed in U.S. Pat. No. 1,982,394 patent (FIG. 7A) shows a multi-ply tape having separate spacer blocks affixed between each pair of plies adjacent to the free end of the tape, and having all of the plies fastened to a common element, which element is free to rock with respect to the frame of the machine. This rockable element is in turn provided with cam-shaped or "lenticular" surfaces to engage the plies of the tape, so that pivoting movement of the rockable element will assertedly equalize the tension among the various plies of the tape. This arrangement suffers from similar disadvantages of cost, complexity and bulk.

Yet another arrangement is shown in FIGS. 1 and 2 of U.S. Pat. No. 1,982,394. Here, the elongated tape itself is constituted by a plurality of straps. Each strap is folded on itself so as to define a bight at the free end of the tape remote from the winding drum. These bights are disposed one inside the other, and extend over a plurality of securement elements, such that each bight rests upon a separate securement element. The securement elements include a central post and a plurality of C-shaped shells concentric with the central post but spaced therefrom. The innermost bight rests upon the central post, whereas the outer bight rests upon individual C-shaped shells. The plies of the tape thus extend from the bights at the free end into two separate runs, one passing to each side of the post. These separate runs merge with one another at the point were the tape wraps onto the drum. The individual plies in each run are spaced apart from one another adjacent the bights, at the free end of the tape, but contiguous with one another where they wrap onto the drum. Accordingly, the individual plies in each run are not parallel with one another. The securement elements are arranged to rock as the drive operates, assertedly to equalize the tension in the various plies of the tape. This arrangement still requires considerable complexity and costs. Moreover, as further explained hereinbelow, this arrangement does not provide exact compensation for the unequal motions of the various plies in the tape, and hence does not maintain the optimum, equal load distribution among the various plies throughout the range of motion of the device.

Additionally, attempts to provide multi-ply tape drives have encountered problems in securing the ends of the individual plies to the machine elements. Thus, U.S. Pat. No. 2,916,922 patent employs a clamp squeezing both plies of the two-ply tape against the drum. U.S. Pat. No. 1,982,394 patent utilizes in some embodiments a clamp or key way bearing on all of the plies and in other embodiments individual securements of the ends of the plies. Attempts to clamp all of the plies together so as to hold the one end of the tape to one of the machine elements work only with a limited number of plies. Where the entire tape is clamped, the friction between the clamping elements and the immediately adjacent plies of the tape must be great enough to withstand the entire load resulting from the tension on all of the plies. The clamping forces exerted by the clamping elements normal to the faces of the tape must be correspondingly large. These forces induce a significant stress in the plies, particularly where there are a great number of very thin plies. The other arrangement, in which each ply is individually clamped to the machine element or drum introduces unacceptable bulk, complexity and cost where there are a great number of plies.

Accordingly, there have been significant, unmet needs for improvements in tape drives and linkages.

SUMMARY OF THE INVENTION

A tape drive according to one aspect of the invention, includes first and second members which are movable relative to one another through a predetermined range of motion, and means for defining a curved surface. The drive also includes a tape including a plurality of flat flexible, but substantially inextensible strip like plies, most preferably formed from a metallic material. The tape has first and second ends, and a lengthwise direction extending between these ends. First and second end connecting means are provided for attaching the first and second ends of the tape to the first and second members respectively, so that loads can be transmitted between the members through the plies of the tape and so that upon motion of the members through the predetermined range of motion, an active region of the tape is wrapped onto and off of the curved surface.

The second end connecting means includes equalizing means for permitting motion of the plies in the tape relative to one another in the longitudinal direction of the tape while the tape is transmitting forces between the members. Most preferably, the tape includes one or more straps, each such strap being bent upon itself so that said one or more straps define a plurality of bights at the second end of the tape. The equalizing means preferably includes an equalizing post attached to the second member, and the bights preferably are looped around the post, so that loads are transmitted between the second end of the tape and the second member through the post and bights. The plies extend from the bights in separate runs, passing on opposite sides of the equalization post. Most preferably the plies within each such run are substantially parallel to one another at least throughout the active region of the tape. Thus, where the bights at the second end of the tape are contiguous with one another, the plies extending away from the bights most preferably are also contiguous with one another.

This aspect of the present invention incorporates the realization that a drive having the plies within each of these runs position substantially parallel to one another throughout the active region of the tape will provide the most accurate compensation for differential movement of the various plies in the tape. Thus, parallelism of the individual plies within each of the two runs provides more accurate load-sharing among the various plies. One of the members may be a drum mounted for pivoting motion about a drum axis, the drum having a curved circumferential surface. As the drum pivots, the tapes winds onto and off of the circumferential surface. In this arrangement, this one member of drum itself serves as the means for defining a curved surface. Alternatively, the drive may include a separate guide member defining a curved guide surface, and the first and second elements may be arranged so that as these elements move through their respective ranges of motion, a greater or lesser portion of the tape is disposed over the curved guide surface. In this arrangement, the relative longitudinal movement of the plies provided by the equalizing means compensates for the differential motion of the plies caused by changes in curvature of the tape during motion of the first and second members.

According to a further aspect of the invention, the first end connecting means may include a fixing post connected to the first member, and the at least one strap included in the tape may be folded so as to define a plurality of bights at the first end of the tape as well. The bights at the first end of the tape may extend around the fixing pin. Thus, longitudinal loads applied through the tape may be transmitted to the first member through the bights at the first end of the tape and through the fixing pin. Most preferably, the at least one strap incorporated in the tape includes a first continuous strap defining a plurality of spiral turns. Each complete turn of the spiral encompasses both the equalizing post and the fixing post. Therefore, each complete turn of the spiral defines one of the bights at the first end of the tape, one of the bights at the second end of the tape, and two plies extending longitudinally between the ends of the tape. The number of plies which may be constituted by a single continuous strap of this nature is essentially unlimited. Most preferably, a single continuous strap constitutes all of the plies in the entire tape. The drive preferably includes strap end securement means for securing portions of the continuous strap adjacent the ends thereof, and hence adjacent the innermost and outermost extremities of the spiral, to adjacent portions of the tape or to the first member in a first end region of the tape outside of the active region.

This aspect of the present invention incorporates the realization that with the continuous strap and spiral arrangement, the load applied to each of the inner and outer strap end securement means will be at most equal to the tension in a single ply of the tape. Only the two end securement means are required for all of the plies defined by the continuous strap. Where the one continuous strap defines all of the plies in the entire tape, only the two end securement means are required for the whole tape, regardless of the number of plies in the tape. This arrangement substantially eliminates the difficulties of cost, complexity, and excessive stress associated with devices previously employed for securing the ends of a tape in a tape drive.

Inasmuch as the present invention, in its preferred forms, provides both effective distribution of the load onto plural plies in a multi-ply tape, and permits effective, simple and reliable securement of the tape ends, the present invention can provide extraordinarily compact and robust tape drives. The individual plies can be extraordinarily thin; as many plies as required may be aggregated to provide a tape with the requisite load capacity. Because the bending stresses in the multi-ply tape are related to the thickness of each ply rather than to the thickness of the tape as a whole, a multi-ply tape as utilized in preferred embodiments of the present invention will work effectively even with relatively small-radius drums or guides. Because the individual plies are superposed on one another rather than arranged side-by-side, the tape can be relatively narrow. Drives according to this aspect of the present invention can be used, for example, in converting pivoting or oscillating motion to reciprocating motion, or in converting the pivoting or oscillating motion of one shaft into pivoting or oscillating motion of another shaft.

The foregoing and other objects, features and advantages of the present invention will be more fully apparent from the detailed description of the preferred embodiments set forth hereinbelow, taken in conjunction with the accompanying drawings.

DETAILED DESCRIPTION OF THE PREFERRED EMBODIMENTS

Figure 1:
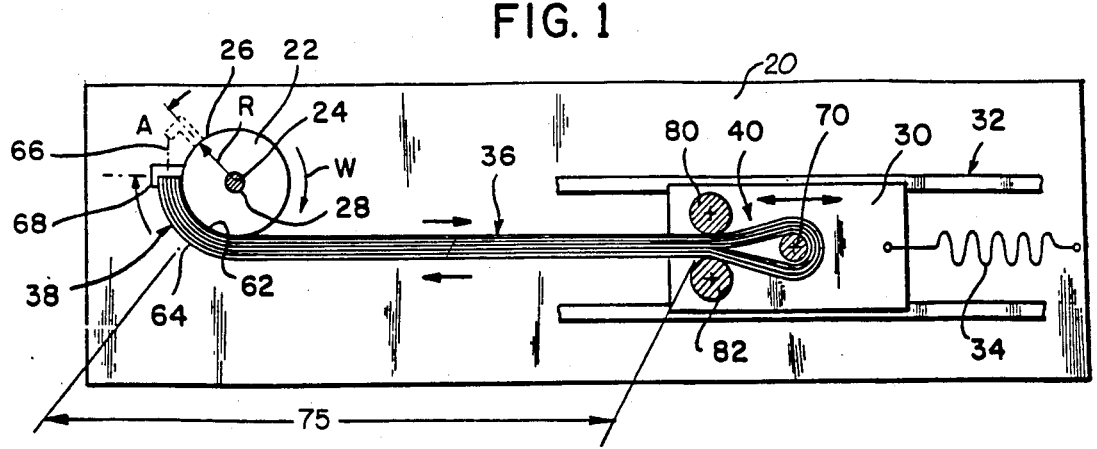
FIG. 1 is a schematic elevational view of a drive according to one embodiment of the present invention.

A drive according to one embodiment of the present invention as shown in FIG. 1, includes a base 20 and a first member 22 in the form of a cylindrical drum having a drum axis 24 and a cylindrical circumferential surface 26 of radius R. Drum 22 is mounted to base 20 by a shaft 28 so that the drum can pivot about axis 24 over a predetermined range of pivotal movement. Shaft 28 and drum 22 are fixedly connected to one another, so that the shaft will transmit torsional loads and pivoting motions to the drum from machine elements (not shown) external to the drive.

A second member 30 is slidably mounted to base 20 by means of track 32 for linear movement relative to the base over a predetermined range. Second member 30 is biased in one direction (to the right, as seen in FIG. 1) by the loads applied from outside the drive. The load-applying machine elements are schematically indicated as a tension spring 34.

Figure 2:
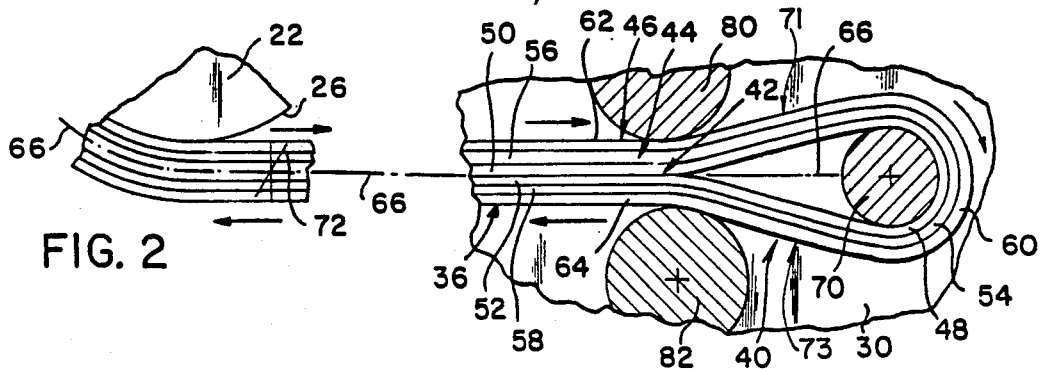
FIG. 2 is a schematic, fragmentary elevational view on an enlarged scale showing portions of the drive illustrated in FIG. 1.

A multi-ply tape 36 is connected between the first member or drum 22 and the second member 30, so that a first portion or end 38 of the tape is connected to the first member or drum, whereas a second portion or end 40 of the tape is connected to second member 30. Tape 36 includes an innermost strap 42, a middle strap 44 and an outermost strap 46. All of these straps are of substantially the same width, and each strap is formed from a thin, flexible but substantially inextensible material, in this case steel shim stock about 0.002 inches (0.05 mm) thick. Each of these straps is folded double so that each strap defines a bight at second end 40 and two elongated plies extending along the length of the tape, from first end 38 to second end 40. Each of the plies defines oppositely directed faces extending along the length of the tape and extending transverse to the lengthwise direction of the tape, into and out of the plane of the drawing as seen in FIGS. 1 and 2. Thus, strap 42 defines bight 48 and two mutually confronting medial plies 50 and 52, whereas strap 44 defines a bight 54 extending around the outside of bight 48 and two intermediate plies 56 and 58 superposed on the exterior faces of medial plies 50 and 52, respectively. Outermost strap 46 defines a bight 60 extending around the outside of bight 54, an exterior ply 62 superposed on intermediate ply 56 and a further exterior ply 64 superposed on intermediate ply 58. The plies of the tape 36 thus define a medial surface 66 extending lengthwise along the tape between plies 50 and 52, there being an equal number of plies on each side of the medial surface. Medial surface 66 is also coincident with the neutral plane of the tape with respect to bending stresses transverse to the lengthwise direction of the tape and transverse to the faces of the plies.

All of the plies are fixedly connected to the first member or drum 22 at first end 38 of the tape by a clamp 68 protruding from the circumferential surface 26 of the drum. At the second end 40 of the tape, the bights 48, 54 and 60 extend around a post 70, referred to herein as an equalizing post. Equalizing post 70 is fixed to second member 30. As will be appreciated from inspection of FIGS. 1 and 2, plies 50, 56 and 62 disposed on one side of medial plane 66 define a run 71 of plies all passing to one side of equalizing post 70, whereas plies 52, 58 and 64 on the opposite side of medial plane 66 form another run 73 passing on the opposite side of the equalizing post. As will also be appreciated, inspection of FIGS. 1 and 2, the plies 50, 56 and 62 constituting run 71 are contiguous with one another, and hence are parallel to one another. Likewise, plies 52, 58 and 64 constituting run 73 are also contiguous with one another and hence parallel to one another. The plies constituting each run are contiguous with one another at all points along their longitudinal extent from the first end 38 of the tape to the joinder of the individual plies with the bights 48, 54 and 60 at the second end. In the position shown, the tape extends partially around the circumference of the drum, so that one face of exterior ply 62 bears on the circumferential surface 26 of the drum, whereas the opposite exterior ply 64 faces outwardly from the drum, away from axis 24. Also, the tape extends generally tangentially from the circumferential surface of the drum towards post 70.

A pair of cylindrical tracking rollers 80 and 82 are mounted to second member 30 so that the axis of each tracking roller extends parallel to the axes of post 70. Each tracking roller 80 and 82 is freely rotatable about its own axis. Tracking rollers 80 bears on exterior ply 62, whereas tracking roller 82 bears on the opposite exterior ply 64. Because the width of the nip defined between tracking rollers 80 and 82 is just slightly larger than the total thickness of tape 36, the tracking rollers maintain the bights 48, 54 and 60 at a constant shape and size. Also, the tracking rollers maintain the two runs 71 and 73 contiguous with one another, and hence parallel to one another, over an active region 75 of the tape.

The lengths of the straps and plies are selected and adjusted during assembly so that in the position shown, all of the plies are under substantially equal tension. In operation, as the drum 22 rotates in the winding direction indicated by the arrow W in FIG. 1, the active region 75 of the tape winds onto the circumferential surface 26 of the drum, and pulls post 70, and hence member 30, to the left as seen in FIG. 1, against the resistance of load 34. As the drum turns in the winding direction, the plies are wound onto the drum at different rates. Thus, inside exterior ply 62, confronting the drum surface, is effectively wound onto a drum of radius R. As the drum pivots through an angle of A radians, the length of ply 62 wound onto the drum is effectively $(A) \times (R)$. Outermost exterior ply 64, however, is effectively wound onto a larger diameter drum. As there are five plies intervening between the circumferential surface 26 of the drum and the surface of ply 64 closest to axis 24, the length of ply 64 wound onto the drum as the drum pivots through the same angle A is $(A) \times (R+5T)$ where T is the thickness of each ply. Thus, ply 64 shifts towards the first end 38 of the tape relative to ply 62, whereas ply 62 shifts towards the second end 40 of the tape relative to ply 64. The disparity in movement of the other plies is similar. Again for a pivoting movement of the drum through angle A, intermediate ply 56 is wound through a distance $A(R+T)$ whereas the other intermediate ply 58 is wound through a distance $A(R+4T)$. Ply 50 is wound through a distance $A(R+2T)$ whereas the other, immediately confronting ply 52 defined by the same strap 42 is wound through a distance $A(R+3T)$. Thus, the medial surface 66 of the tape moves through a distance which is equal to the average movement of all of the plies, viz, $A(R+2.5T)$.

Plies 50, 56 and 62 constituting run 71 are on the inside of the curve, between medial surface 66 and drum 26. These plies shift relative to the other plies towards the second end 40 of the tape. Plies 52, 58 and 64 of run 73, on the outside of the curve shift relative to the other plies towards the first or drum end. The velocity distribution of the plies relative to the average velocity of the tape is indicated by linear curve 72 (FIG. 2).

Although the plies move relative to one another the tape as a whole does not shift in the lengthwise direction, along neutral surface 66 relative to either of the elements. Thus, the tape as a whole moves towards the first element or drum. As the drum pivots through angle A in the winding direction, the average movement of the tape is $A(R+2.5T)$. As will be appreciated, the average movement of any two plies constituting the same strap will also be $A(R+2.5T)$, i.e., the same as the average movement of the tape as a whole. Thus, the shift of ply 62 towards the second end will exactly balance the shift of ply 64 towards the first end, and the same will be true of plies 56 and 58 and 50 and 52. As ply 62 shifts towards the second end 40, a portion of strap 46 moves aroiund the bight and into ply 64. Likewise, strap 44 feeds through bight 54 and strap 42 feeds through bight 48. Thus, post 70 permits relative movement of the various plies in the tape so as to equalize tensions in the various plies, but does not permit the tape as a whole to move relative to second member 30. Kinematically, the drive functions as if a single ply, inextensible strap or tape of infinitely small thickness were wrapped on a drum having radius equal to $(R+2.5T)$ and that infinitely thin tape were rigidly connected to post 70.

As the drive operates, and the members 22 and 30 move through their respective ranges of motion, the plies constituting run 71 remain contiguous with one another and hence parallel to one another and the plies constituting run 73 likewise remain contiguous with one another and parallel to one another within the active region 75 of the tape.

As mentioned, the thicknesses of the individual plies in the tape preferably are small, normally less than about 0.015", preferably less than about 0.005" and most preferably about 0.002" or less. The maximum total stress in the tape (the sum of the tensile and bending stresses) is given by the formula:

$$S = ET/D + F/NTW$$

WHERE:
S is the maximum total stress in the tape;
E is the modulusof elasticity of the material in the tape;
T is the thickness of each individual ply;
D is the diameter of the smallest drum or pulley onto or around which the tape wraps;
F is the force applied to the tape in the lengthwise direction;
N is the number of plies in the tape; and
W is the width of the tape.

Although the relative movement or shifting of the plies mentioned above is critical to maintaining equal tension in all of the plies as the drum pivots, the actual amount of such relative motion is very small. Thus, even where they are substantial forces between the plies, between adjacent bights or between a bight and the post, the work done in moving plies and bights relative to one another and relative to the post will be very small. Stated another way, there is an enormous mechanical advantage in the system between drum rotation and relative sliding movement of the plies and bights. Friction between the plies and bights does not tend to introduce any discernible stick-slip action or binding in the system. Desirably, a lubricant is between the plies and between the bights. The lubricant may include a relatively viscous, film forming material such as polyisobutylene, sold under the registered trademark "STP." More preferably, the lubricant is a grease specifically selected for low sliding velocity, high load conditions. The grease desirably includes molybdenum disulfide, a fluoropolymer such as polytetrafluoroethylene or a combination of these. Moreover, the distances involved in relative motion of the plies typically are so small that the relative motions can be accommodated by shearing of the lubricant film between the plies. If desied, the lubricant can be omitted and a shearable film material such as a plastic or rubber can be interposed between plies. With the small motions involved, the work and forces involved in the shifting motion of the bights and plies relative to one another and in the shifting motion of the innermost bight 48 relative to post 70 typically do not follow the conventional equations for predicting frictional resistance based on a "coefficient of friction." Motion of the plies and bights relative to one another and relative to post 70 can and does occur even in systems where the conventional equations for a flexible element wrapped on a capstan would suggest that no movement will occur.

Because the plies constituting the tape 36 are extremely thin, the bending stresses in the individual plies are far lower than would be the bending stresses in a solid tape of the same total thickness. This allows the use of a drum 22 having an extremely small diameter. For example, the bending stresses induced in 0.002" thick plies are acceptable for drum diameters as small as about ¼". As will be appreciated, this affords very significant opportunities for making a compact drive, and permits the drive to have a high mechanical advantage, with a low ratio between rotation of shaft 28 and movement of member 30.

Moreover, many materials, and particularly metallic materials, have higher tensile strengths in low-thickness form such as thin tapes and ribbons than in thicker cross sections. Metallic materials typically are rolled or cold-worked to these low thicknesses, thereby developing substantial grain orientation in a direction of elongation and hence substantially increased tensile stength in this direction. Desirably, the tape is fabricated so that the direction of grain orientation, and hence the direction of highest tensile strength, extends in the longitudinal direction of the tape. Any increased stiffness imparted by cold working does not materially adversely affect the system, inasmuch as the bending strains are extremely low. Other materials, including metallic materials, are avaiable in thin, ribbon-like forms in an amorphous state. These materials, also referred to as "metallic glasses" can also be employed in tapes according to the invention.

Figure 3:
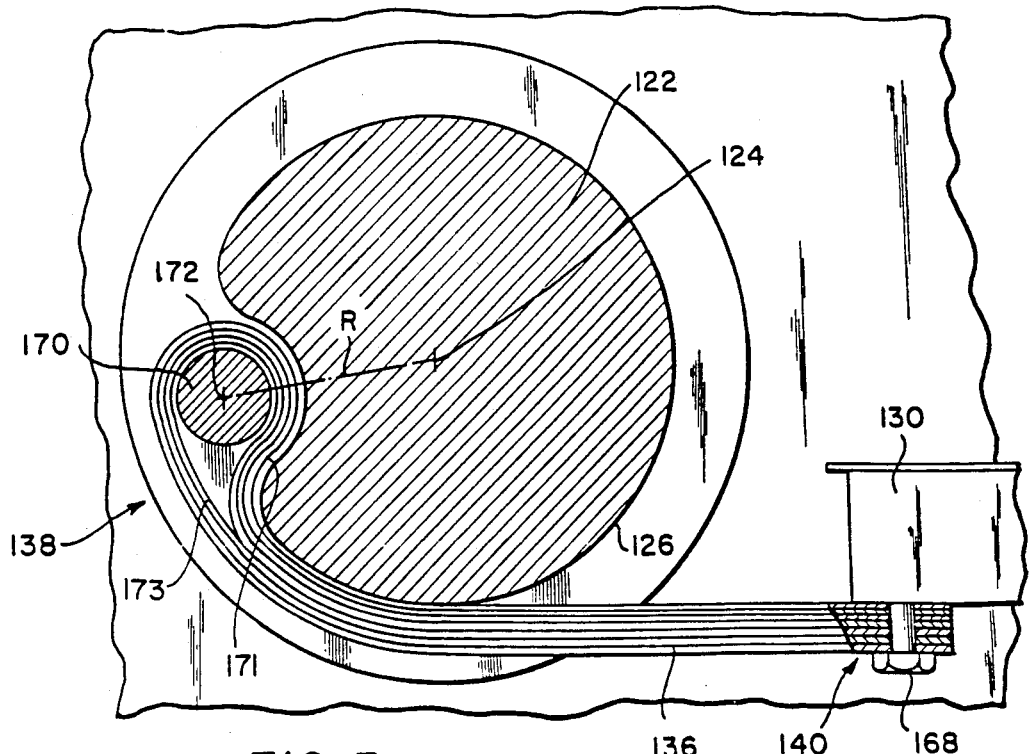
FIG. 3 is a schematic elevational view showing a drive according to a further embodiment of the present invention.

The drive shown in FIG. 3 is essentially the same as that shown in FIGS. 1 and 2, except that the end connecting means are reversed. In the drive of FIG. 3, the end connecting means 138 affixing the tape 136 to the drum 122 includes an equalizing post 170 allowing for movement of the individual tape plies relative to one another, whereas the end connecting means attaching the end 140 of the tape to the slidable member 130 includes a clamp 168 rigidly clamping all of the plies to the member 130. The post 170 included in the drum-end connecting means in the device of FIG. 3 is disposed so that the central axis 172 of the post lies at a radius R from drum axis 124 equal to the radius R of the cylindrical circumferential surface 126 of drum 122. In the drive of FIG. 3, the circumferential surface 126 of the drum serves to maintain the runs 171 and 173 at a constant shape and size during operation of the drive. Here again, the plies in each run remain parallel to one another during operation of the drive. This embodiment is less preferred, vis a vis the embodiment illustrated in FIGS. 1 and 2, inasmuch as there are some additional frictional losses caused by sliding between one ply of the tape and the circumferential surface 126 of the drum during relative movement of the tape plies.

Figure 4:
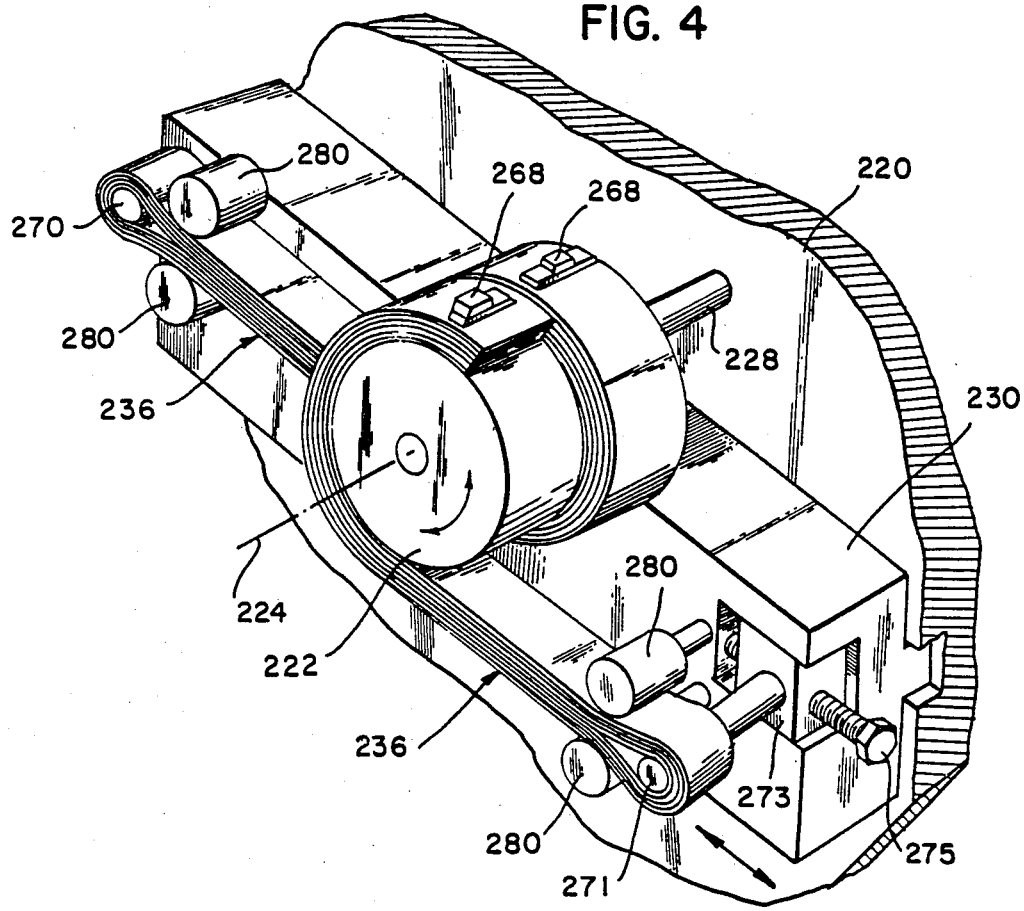
FIG. 4 is a schematic, fragmentary perspective view showing a portion of a drive according to a still further embodiment of the present invention.

The embodiment of FIG. 4 is essentially similar to that of FIGS. 1 and 2, except that two tapes 236 are arranged "back-to-back" on the same drum 222, the tapes being wrapped in opposite directions around the circumferential surface of the drum and extending in opposite directions to the second member 230. The first end of each tape is clamped to drum 222 by a clamp 268. There are two posts 270 and 271, one post being associated with each tape. A pair of tracking rollers 280 is associated with each post 270 and 271, and constrains the runs extending to the post. Each post provides equalization of the tension in the various plies in the associated tape as the drive operates. Because one of the tapes will be wound onto the drum, and hence will be placed under tension, upon rotation of drum 222 about axis 224 in either direction, the drive of FIG. 4 will positively drive second member 230 in linear motion upon rotation of shaft 228 in either direction relative to base 220.

To provide initial pretensioning of both tapes 236, one of the posts 271 is mounted to the second element or slider 230 by means of a movable block 273. A tensioning screw 275 is threadedly engaged with block 237 and bears upon the main body of second element 230 so that by turning bolt 275, post 271 can be moved to the right, as seen in FIG. 4 relative to member 230, thereby pulling the associated tape 236 and turning the drum 222 and shaft 228 so as to also tension the other tape 236.

A drive as shown in FIG. 4 will provide positive, bidirectional, conversion of pivoting motion of shaft 228 to linear motion of second member 230, or vice versa. Such drives can be applied in general mechanical applications, but are particularly well suited to use in automotive steering gear applications. As is well known in the art, automotive steering systems typically require an element, such as a rack and pinion, a recirculating ball nut or the like adapted to convert the rotary motion of the steering wheel shaft into linear motion of a steering linkage member. In a variant of the drive shown in FIG. 4, the tapes 236 can be made longer and wrapped around intermediate rollers or pulleys, so that drum 222 can be positioned remote from member 230.

Figure 5:
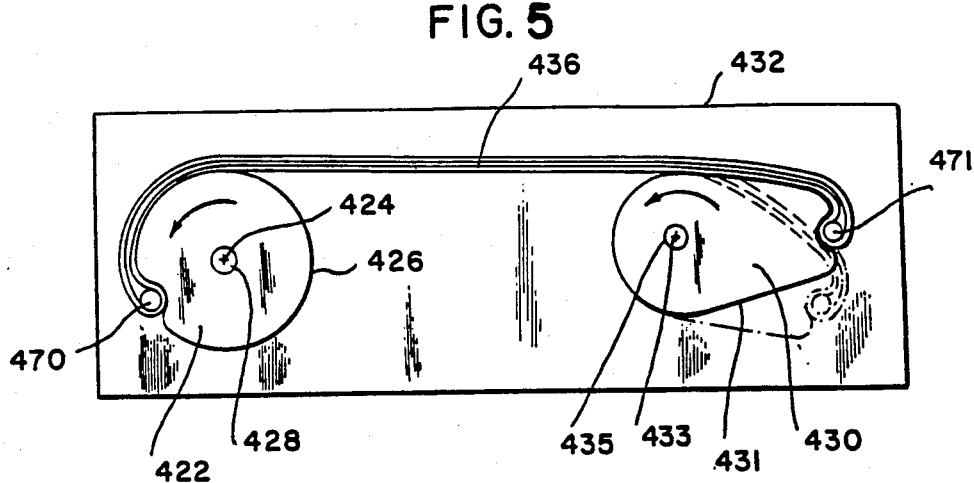
FIG. 5 is a schematic elevational view showing a drive according to a further embodiment of the present invention.

In the arrangement of FIG. 5, both of the members 422 and 430 are drums mounted for pivoting or limited rotational movement relative to the base 432. Although the circumferential surface 426 of first member or drum 422 has a substantially constant radius about axis 424, the other member or drum 430 has a circumferential surface 431 which is non-cylindrical. Surface 432 has a radius of curvature about axis 433 which varies at different locations on the circumferential surface 431. Also, at at least one point along the circumferential surface 431, the radius of curvature of surface 431 is different from the radius of curvature of the circumferential surface 426 on the other member. As will be appreciated, pivoting of shaft 428, connected to first member or drum 422 at a constant angular velocity, will cause pivoting of shaft 435 at a varying angular velocity as the drive moves through its range of motion. Also, the wrapping and unwrapping of the tape onto the surfaces of the various drums will cause differential movement of the plies in tape 436, and this differential movement is permitted by post-type connecting means 470 and 471, similar to those described above, which permit equalizing movements of the individual plies. The same drive can be made with an equalizing type or post-type connecting means at only one end of the tape, and with all plies in the other end of the tape rigidly connected to one or the other of the drums. As will be appreciated, substantially any non-cylindrical drum surface can be employed to provide substantially any desired pattern of relative rotational velocities of the two shafts. Also, a non-cylindrical drum surface can be employed to provide rotary to linear motion conversion or vice versa with a non-uniform mechanical advantage. This type of arrangement can be used to good advantage, for example, in providing a variable-ratio steering gear for an automobile. Because the equalizing arrangement utilized in the present invention does not depend upon the particular radius of curvature of a drum surface, and because the multi-ply tape can be wound onto drum surfaces having particularly small radii, variable ratio devices according to this aspect of the present invention provide effective, compact and inexpensive substitutes for complex and expensive variable ratio linkages heretofore utilized.

Figure 6:
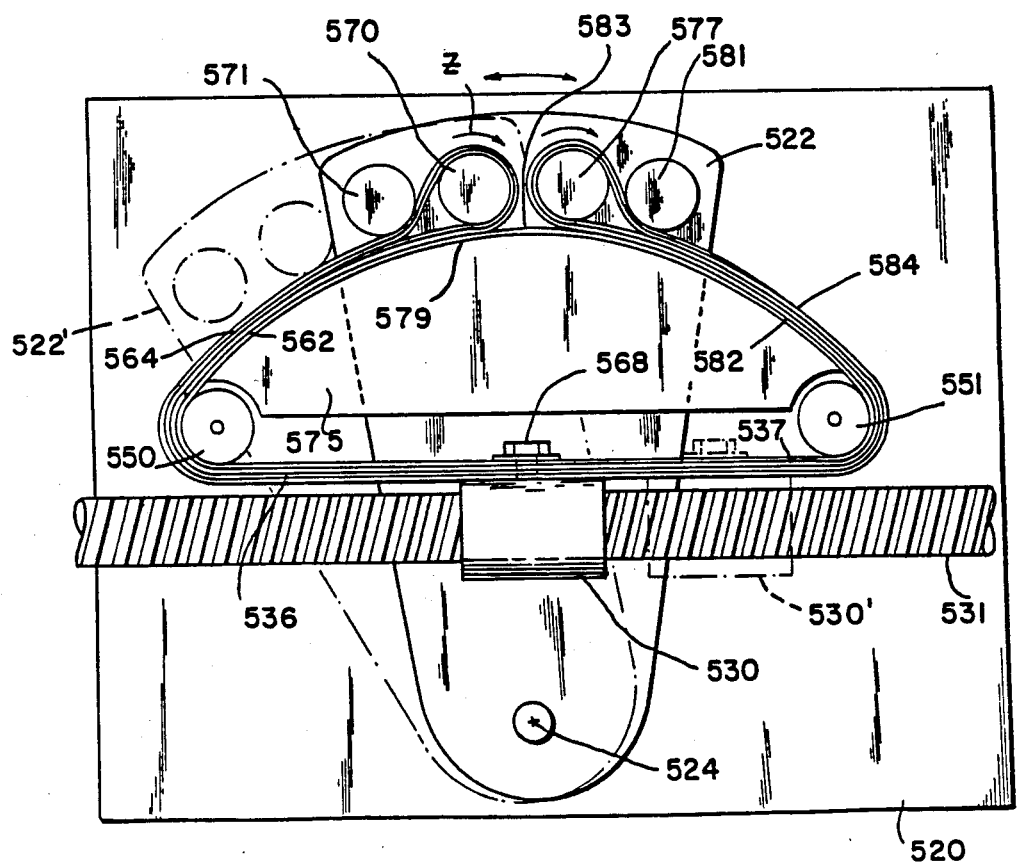
FIG. 6 is a further schematic elevational view depicting a drive according to a still further embodiment of the invention.

The drive shown in FIG. 6 is a bidirectional drive connecting a second member 522 mounted for pivoting movement relative to base 520 about an axis 524 and a first member 530 mounted for linear movement, to the left and to the right as seen in FIG. 6, relative to base 520. First member 530 has internal ball members (not shown) linking the second member to a threaded screw shaft 531, so that rotary movement of screw 531 is interconverted with linear movement of first member 530.

The drive of FIG. 6 includes two tapes 536 and 537 extending in opposite directions from a common clamp 568 rigidly securing both plies of both tapes to first member 530. Tape 536 extends around an intermediate roller 550 to a post 570 which is rigidly mounted to second member 522. A tracking roller 571 is rotatably mounted to first member 522, and serves to maintain the size and shape of the runs extending to post 570 at the end of tape 536. A fixed guide 575 having a curved, arcuate guide surface 579 is rigidly mounted to base 520, and a portion of tape 536 between roller 550 and post 570 is curved around arcuate guide surface 579. The other tape 537 extens in the opposite direction from common clamp 568, around a further intermediate roller 551, to a further post 577. A tracking roller 581 is provided adjacent post 577. Although the plies of tape 536 are continuous with the plies of tape 537, the two tapes are separate tapes from the kinematic point of view. Thus, clamp 568 which secures all of the plies to first member 530, effectively establishes an end for each tape at first member 530. In addition to the plies constituting tapes 536 and 537, a buffer strip 583 extends from clamp 568, around intermediate pulley 550, over the fixed guide 575, around intermediate pulley 551 and back to clamp 568. As will be appreciated, buffer strip 583 is connected only to first member 530 and is not connected to second member 522.

In the drive of FIG. 6, neither of the members serves as a drum. Thus, neither of the tapes winds onto or off of any surface of member 522 or member 530 as the drive operates. However, each of tapes 536 and 537 is in part curves around the surface of arcuate guide 575. Thus, the region of tapes 536 from post 570 to intermediate pulley 550 is curved around the surface 579 of the guide. As the first member 530 is moved to the right, towards the moved position illustrated in broken lines at 530', tape 536 pulls post 570, so that the second member 522 swings counterclockwise, towards the moved position shown at 522'. As the members move in this direction, a progressively smaller portion of tape 536 is curved over arcuate surface 579, whereas a progressively greater portion of tape 536 is disposed in the straight section of the tape, from intermediate pulley 550 to clamp 568. As will be appreciated, the overall or average curvature of the tape 536 decreases, and tape 536 is effectively unwound off of the curved surface of the guide member.

For each increment of arcuate movement of member 522 in the counterclockwise direction, the length of outside ply 564, furthest from arcuate surface 579 fed around pulley 550 exceeds the length of inside ply 562 fed around pulley 550. Therefore, the outside ply 564 of tape 536 tends to go slack, whereas the inside ply 562 tends to increase in tension. These tendencies are counteracted by the post 570 and the bights looped around the post. As the second member 522 pivots counterclockwise, towards position 522', the bights constituted by the plies of tape 536 will move slightly clockwise around post 570, as indicated by arrow Z, thereby equalizing the tension in all of the plies. Of course, as the second member 522 swings in this counterclockwise direction about axis 524, a progressively greater portion of the other tape 537 will be curved around arcuate surface 579 of the stationary guide 575. The average curvatute of the tape 537 will tend to increase, as progressively greater proportions of the tape are wrapped onto the curved surface 579, and progressively smaller portions of the tape 537 are disposed in the straight section from roller 551 to clamp 568. Thus, the ply 582 of tape 537 adjacent the inside of the curve will tend to go slack, whereas the ply 584 at the outside of the curve will tend to tighten, and these tendencies are resisted by shifting of the bights around post 577. Upon movement of first member 530 to the left in FIG. 6, and pivoting movement of second member 522 in the clockwise direction, the situation is exactly the reverse. In either case, however, the equalizing action provided by the tape end connecting means or posts 570 and 577 maintains equal tension in all plies of each tape. In this case as well, the plies within each run of the tape 536 extending on each side of equalizing post 570 are parallel to one another. Likewise, the plies in each run of tape 536 are parallel to one another.

Buffer strip 583 is not connected to second member 522. The buffer strip is employed principally to absorb frictional forces. Thus, because the buffer strip moves across arcuate surface 579 with velocity close to the velocity of the adjacent plies 562 and 582 of tapes 536 and 537, the principal friction in the system is friction between buffer strip 583 and surface 579. Therefore, loads imposed by friction will be borne principally by the buffer strip rather than by the actual plies of either tape 536 or 537.

Drives according to FIG. 6 provide positive transmission of pivotal motion with extraordinarily compactness and extraordinary torque capabilities. For example, a drive according to this embodiment may fit within an enclosure about 3" by 2" by 1" and may have a weight of only about 2 lbs., but may apply a torque of up to about 2500 in.-lb. to member 522 about axis 524 upon movement of member 530. The drives according to this aspect of the invention also provide excellent stiffness. Where the two tapes are initially pretensioned, there is no slack or slop in the system. Where member 530 is rigidly held in fixed position by other elements of the system, as by screw 531, the drive will hold member 522 in fixed angular position about axis 524 even against extraordinarily high loads applied to member 522. Where, as shown, arcuate surface 579 is a sector of a cylinder and is coaxial with axis 524, the drive provides an exactly constant mechanical advantage. Thus, each increment of linear movement of member 530 produces exactly the same incremental angular movement of member 522 about axis 524. The preferred drives according to this aspect of the invention exploit the extraordinary properties attainable with very thin, multiple plies in place of thicker, single plies. In a preferred embodiment, each of rollers 550 and 551 is approximately $\frac{1}{2}''$ in diameter, and each of tapes 536 and 537 incorporates ten steel plies, each about 0.0015'' thick and each about $\frac{1}{2}''$ wide in the transverse direction (the direction into and out of the plane of the drawing in FIG. 7). Each tape can carry a tension load of about 1,570 lbs. At this loading, the stress in each tape is about 300,000 lb./in.$^2$, of which 90,000 lb./in.$^2$ is attributable to bending and 210,000 lb./in.$^2$ is attributable to tension. Therefore, the drive according to this aspect of the present invention affords advantages of compactness which could no be attained using a conventional single-ply tape.

Figure 7:
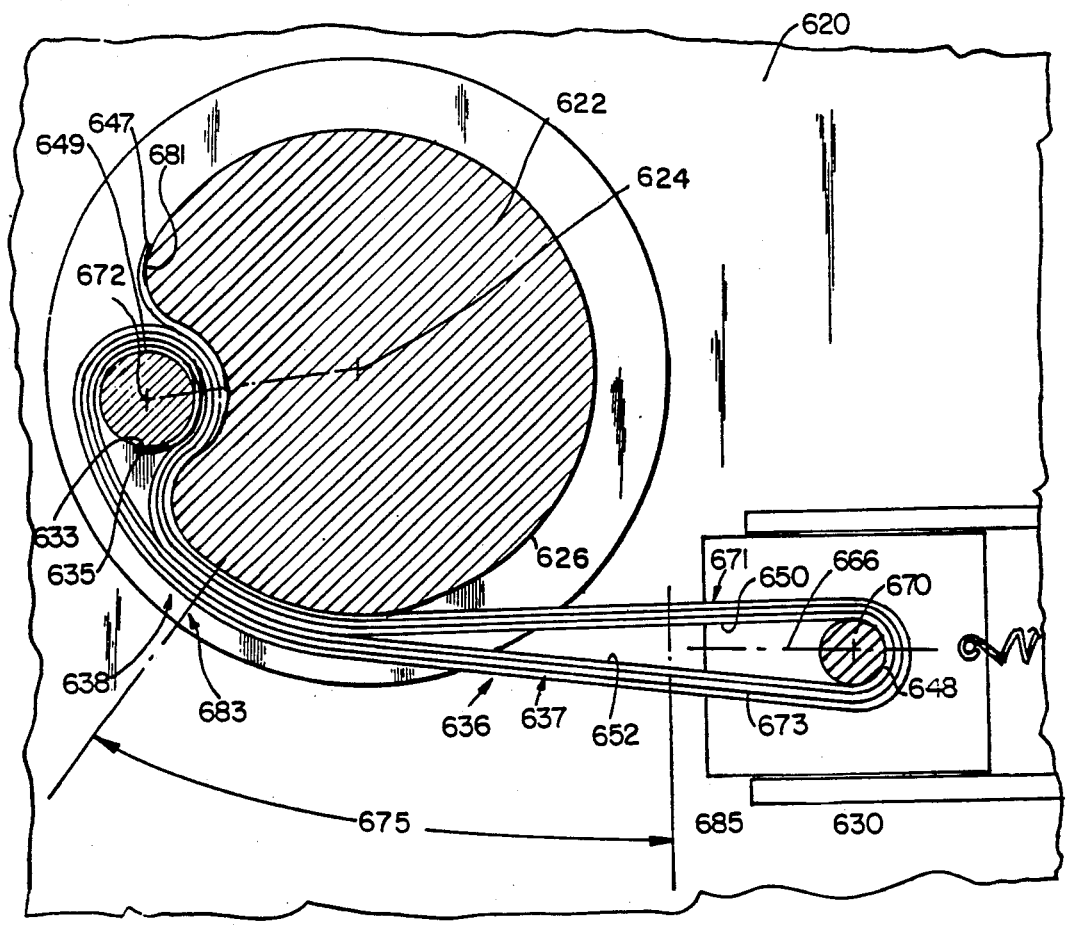
FIG. 7 is a schematic, elevational view showing a drive according to yet another embodiment of the present invention.
Figure 8:
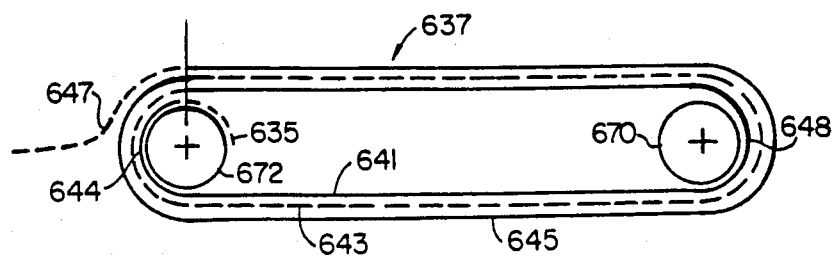
FIG. 8 is a schematic view illustrating a strapwinding arrangement employed in the embodiment of FIG. 7.

The drive illustrated in FIGS. 7 and 8 is generally similar to the drive discussed above with reference to FIGS. 1 and 2. However, in the drive of FIGS. 7 and 8, the drum or first member 622 has a post 672, referred to herein as a fixing post, mounted rigidly to the drum. The second member 630 has an equalizing post 670. The entire tape 636 is constituted by a single, continuous, flexible but substantially inextensible steel strap 637. A first end 635 of strap 637 is secured to fixing post 672, and thus to first member 622 by a small piece of adhesive tape 633 adhering both to the post and to the strap.

The strap 637 extends from strap end 635 in a spiral pattern. The topology of the spiral is shown in FIG. 8. Starting from end 635, continuous strap 637 extends outwardly in a first complete turn 641 encompassing both fixing post 672 and equalizing post 670, then a second complete turn 643, shown in broken lines, around turn 641 and hence also encompassing both posts 672 and 670, and then a third complete turn 645 around turns 643 and 641 and hence also encompassing both posts 670 and 672. An outermost end zone 647, shown in broken lines, follows after complete turn 645, at the outermost end of the spiral. Innermost turn 641 defines a bight 649 at the first end 638 of the tape, this bight extending around fixing post 672. The same turn 641 defines a longitudinally extensive ply 652, a bight 648 at the second end of the tape around equalizing post 670 and another longitudinally extensive ply 650 on the opposite side of the medial plane 666 of the tape. Each of the other complete turns in the spiral likewise defines a bight at each end of the tape and two longitudinally extensive plies. As in the other embodiments, the plies of the tape are disposed in two separate runs 671 and 673 passing on opposite sides of equalizing post 670. These two plies defined by each turn of the spiral are disposed in opposite runs, one in run 671 and the other in run 673. The end 647 of the strip 637 at the outermost end of the spiral is secured to drum or first member 622 by a further piece of adhesive tape 681 interposed between the continuous strip and the drum.

The drive illustrated in FIGS. 7 and 8 operates in substantially the same way as the drive described above with reference to FIGS. 1 and 2. Thus, first member or drum 622 pivots about axis 624 over a limited range of motion. Upon such pivoting motion, second member 630 slides with respect to base 620. The range of motion of the members is selected so that only an active region 675 of the tape lying between predetermined locations 683 and 685 along the length of the tape winds and unwinds onto and off of the curved circumferential surface 626 of the first member. As the tape winds and unwinds onto and off of the circumferential surface, the individual plies shift relative to one another so as to compensate for changes in the overall curvature of the tape. The individual plies shift relative to one another, in substantially the same way as described above.

Inasmuch as the first end region of the tape, between point 683 and the first end of the tape (to the left of point 683 as seen in FIG. 7) is outside of active region 675, this first end region does not wind or unwind from the drum. There is no relative movement of the plies in this first end region of the tape. Thus, the individual plies and bights do not move around fixing post 672. Kinematically, the system acts in much the same way as if all of the plies in the tape were rigidly clamped to the drum at point 683. Thus, attachment of the outermost extremity 647 and innermost extremity 635 of the continuous strap constituting the tape to the drum in the first end region does not impede load sharing among the plies.

The spiral wound arrangement shown in FIGS. 7 and 8 provides significant advantages. The force tending pull innermost extremity 635 of the strip away from the first member and hence away from the fixing post 672 will be no more than that portion of the tension load transmitted by a single ply of the tape. Likewise, the force tending to move the outermost extremity 647 of the strip with respect to the first member will also be no more than the load on one ply of the tape. The end securement means attaching these extremities to the first member need only resist relatively small loads. Simple and inexpensive adhesive means, such as ordinary double-faced adhesive tape can be employed successively. Other conventional securement devices such as clamps, welds, rivets and the like can also be used. For example, clamps may be provided on first member 622 or on fixing post 672, each such clamp having a pair of opposed jaws, one extremity of the strip being engaged between each pair of opposed jaws. Whatever form is employed, the securement need only be such as to resist the relatively limited forces on the extremity of the strip rather than to resist the entire tension load on the tape. Therefore, any localized stresses in the strip at the securement device can be correspondingly limited. Adhesive bonding arrangements are useful where the strip constituting the tape is relatively thin. A relatively short length of such a strip can provide a surface area for bonding many times greater than the cross sectional area of the strip. Therefore, the adhesive bond on the surface of the strip can be as strong or stronger than the strip itself even if the shear strength per unit area of the bond is considerably less than the tensile strength per unit cross sectional area of the strap. Additionally, the spiral wound arrangement facilitates manufacture of the tape. The entire tape can be fabricated simply by winding the continuous steel strap about itself to form the spiral. The wound tape can then be fit onto the members as shown in FIG. 7, and the extremities of the strap can be secured in place. The advantages of the spiral wound tape both in fabrication and in operation become especially significant as the number of plies in the tape becomes larger. Thus, although a tape with only six plies is shown for simplicity, the most preferred tape drives in accordance with the invention may include more then ten plies, and in some cases twenty or more plies.

The angle between the two runs 671 and 673 of the drive shown in FIG. 7 changes as second member 630 moves towards and away from the drum or first member 622. Thus, the diameter of equalizing post 670 remains constant, whereas the distance between the equalizing post and the drum changes with movement of the second member 630. This change in the angle between the plies causes a minor, additional component of motion caused by shifting of runs about the equalizing post to compensate for the change in angle between them. Therefore, the linear motion of second member 630 is not exactly proportional to the pivoting motion of first member 622. Where this additional component of motion is objectionable, the same can be eliminated by providing tracking roller or other guiding elements, similar to the tracking rollers 80 and 82 (FIG. 1) so as to maintain the two runs of the tape contiguous to one another. The change in the angle between the two runs should be clearly distinguished from a change in angles between plies within the same run. In the drive of FIG. 7 as in the other drives discussed above, the plies within each run remain contiguous with one another and hence parallel with one another throughout the active region 675 as required for proper load sharing between the plies.

Figure 9:
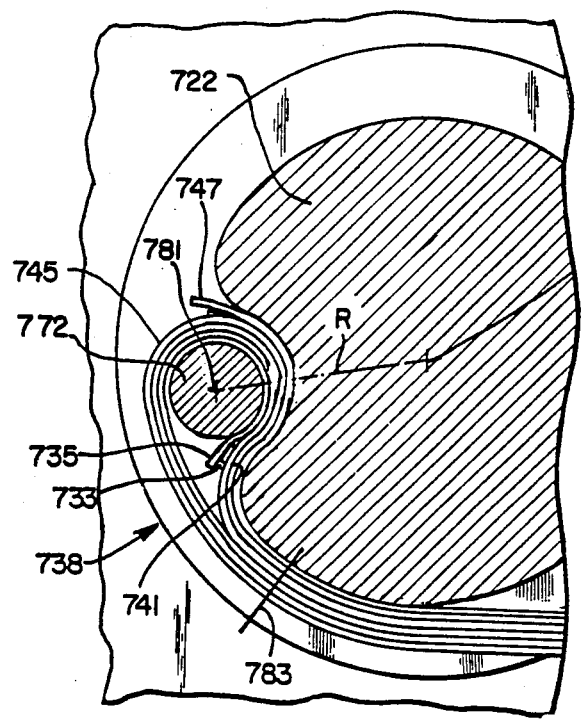
FIG. 9 is a fragmentary, schematic view showing a portion of a drive in accordance with yet another embodiment of the present invention.

A drive according to yet another embodiment of the present invention, as shown in FIG. 9 is generally similar to the drive discussed above with reference to FIGS. 7 and 8. In the drive of FIG. 9, the range of motion of the members is selected so that only the active region of the tape, to the right of point 783 along the length of the tape winds and unwinds on the curved, circumferential surface of the first member 722. There is no relative motion of the plies in the first end region 738 of the tape, to the left of point 783 as seen in FIG. 9. The tape is spiral-wound structure incorporating a single, continuous strap defining all of the plies and bights. An equalizing post (not shown) is provided at the other end of the tape. The innermost extremity 735 of the strap, at the innermost extremity of the spiral, is secured to the immediately adjacent complete turn of the spiral 741 by an adhesive element 733 interposed between the extremity and the ply defined by the innermost turn. Likewise the outermost extremity 747 of the spiral is secured to the immediately adjacent complete turn by a similar adhesive element 781 interposed between the outermost extremity of the spiral and the bight defined by the outermost complete turn 745. Both the innermost and outermost extremities are secured to the neighboring complete turns in the first end region of the tape, where the plies need not shift relative to one another. Inasmuch as the bights defined by the tape at the first end extend around fixing post 772, the tape as a whole cannot move relative to the first member. Here again, the load applied to each extremity of the spiral tending to unwind the spiral and hence shift the extremity relative to the adjacent complete turn will be at most equal to the tension in a single ply of the tape.

Securement of the extremities of the strap to the neighboring complete turns in this fashion does not impede load sharing between plies of the tape provided that the extremities are secured only in the first end region of the tape, outside the active region, where the curvature of the tape does not change during operation of the drive and where the plies need not shift relative to one another. Load sharing will not be impeded even if some or all of the complete turns are secured to one another in the first end region. Thus, the extremities of the tape can be secured to the neighboring turns by processes which may bond all of the turns to one another, such as by dipping in an adhesive or the like. These additional bonds between turns likewise will not impeded load sharing provided they are confined to the first end region of the tape, outside of the active region. Securement of the tape extremities to the neighboring turns provides advantages in manufacturing, as the securement can be made before the tape is assembled to the remaining components of the drive.

Numerous variations and combinations of the features described above can be employed without departing from the present invention. Thus, in the drive discussed above the several plies in each run of the tape are contiguous with one another, and the bights at the second end of the tape extending over the equalizing post are also contiguous with one another, so that the plies in each run and the bights at the second end of the tape are all parallel to one another and remain so throughout operation of the drive. However, contiguity is not essential. The drive will operate in substantially the same manner if the plies of each run and the bights at the second end of the tape on the equalizing post are parallel but spaced from one another by an equal, uniform amount. Such spacing can be achieved by interposing sheetlike spacing elements between the plies and either continuing the sheetlike spacing elements around each bight or interposing separate, C-shaped spacing elements of equal thickness to the sheetlike spacers between adjacent bights at the second end of the tape.

The plies constituting each run need not be parallel to one another throughout their entire length. Only those portions of the plies within the active region of the tape, which are wrapped onto and off of the curved surface during operation of the drive need remain parallel to one another. It is possible to construct an arrangement in which each run of the tape feeds between a pair of tracking rollers or the like secured to the second member, so that the plies in each run in that portion of the tape extending from the first member or curved surface to the tracking rollers are maintained parallel to one another, but portions of the plies in each run beyond the tracking rollers spread apart from one another to merge with bights held in spaced relation to one another. Thus, the plies within each run are parallel to one another in the active region of the tape but not parallel to each other in a second end region. Such an arrangement requires inordinate complexity and additional elements.

In a spiral-wound tape, a single continuous sheetlike spacer element can be arranged in confronting relation with the continuous strap and wound into the spiral arrangement along with the strap so as to form an interpenetrating spiral, with one turn of the spacer interposed between each two adjacent turns of the spiral strap. The interposed spacer may be a material of relatively low tensile properties but having good lubricity. Although it is preferred to employ a single, continuous strap to form all of the plies in a spiral-wound tape, more then one continuous strap may be employed. Such plural straps can be superposed upon one another and wound into a spiral so as to form interpenetrating spirals with one turn of each strap lying between each two adjacent turns of another strap. Alternately, plural straps can be arranged in a sequence with one strap forming an inner portion of the spiral and another strap forming a further portion of the spiral. In either case, end portions of each spiral should be secured to the first member or to a neighboring portion of the tape in the first end region of the tape, where the curvature of the tape does not change and where the plies do not shift relative to one another.

In the arrangements discussed above, the equalizing post is fixed to the second member. If desired, the equalizing post can be mounted for pivoting motion about its own axis and hence about the axis of the bights superposed thereon. Also, in all of the arrangements discussed above, the first member and the second member are mounted to a base or frame, such that each of the first and second members is movable with respect to the base. However, one or another of the members connected by the tape may itself contribute the base. Thus, the slidable, second member described in each of FIGS. 1, 3 and 7 may be a part of the base, and the pivoting first member may be arranged for slidable movement as well as pivoting movement relative to the base.

As these and other variations and combinations of the features described above can be utilized without departing from the present invention as defined in the claims, the foregoing description of the preferred embodiments should be taken by way of illustration rather than by way of limitation of the invention as defined in the claims.

What is claimed is:

1. A drive comprising:
(a) first and second members movable with respect to one another over a predetermined range of motion;
(b) means defining a curved surface;
(c) a tape having first and second portions and a longitudinal direction extending between said portions, said tape comprising at least one flat, elongated, uniform, flexible but substantially inextensible strap folded so that said at least one strap defines a plurality of bights at said second portion of said tape and a plurality of longitudinally extensive plies;
(d) first and second portion connecting means for connecting said first and second portions of said tape to said first and second members, respectively, so that said members are linked to said plies for transmission of forces between said members and so that upon movement of said members relative to one another an active region of said tape is wrapped onto or unwrapped from said curved surface, said second portion connecting means including equalizing means for permitting longitudinal movement of said plies relative to one another, said equalizing means including an equalizing post connected to said second member, said bights extending around said equalizing post, said plies extending from said bights in two runs passing on opposite sides of said equalizing post, said equalizing means including means for maintaining the plies in each said run parallel to one another as said plies extend from said equalizing post through said active region of said tape to said curved surfaces.

2. A drive as claimed in claim 1 wherein said first portion connecting means includes a fixing post connected to said first member, said at least one strap being folded so as to define a plurality of bights at said first portion of said tape extending around said fixing post.

3. A drive as claimed in claim 2 wherein said at least one strap includes a first continuous strap having first and second lengthwise extremities and defining a plurality of spiral turns, each complete one of said turns encompassing both said posts whereby each complete one of said turns defines one of said plies in each of said runs of said tape.

4. A drive as claimed in claim 3 wherein said first continuous strap defines all of said plies in said tape.

5. A drive as claimed in claim 3 further comprising strap end securement means for securing each of said first and second lengthwise extremities of said first continuous strap to said first member or to an adjacent portion of said tape in a first portion region of said tape adjacent said first portion thereof and outside of said active region.

6. A drive as claimed in claim 5 wherein said strap end securement means includes means for fastening at least one of said first and second lengthwise extremities to an adjacent turn of said first continuous strap within said first portion region.

7. A drive as claimed in claim 6 wherein said strap end securement means includes an adhesive interposed between one of said extremities and an adjacent one of said turns within said first portion region.

8. A drive as claimed in claim 5 wherein said strap end securement means includes means for fastening at least one of said first and second lengthwise extremities of said first continuous strap to said first member.

9. A drive as claimed in claim 8 wherein said means for fastening at least one of said first and second lengthwise extremities to said first members includes most for fastening said first extremity to said fixing post.

10. A drive as claimed in claim 1 wherein one of said members has a curved circumferential surface whereby said means for defining a curved surface includes said one of said members, said members being movable relative to one another so that portions of said tape will be wrapped onto and off of said circumferential surface upon said motion.

11. A drive as claimed in claim 10 further comprising a base, said one of said members being mounted to said base for pivoting movement relative to said base about a drum axis, said circumferential surface being remote from said drum axis, an other one of said members being movably mounted to said base.

12. A drive as claimed in claim 11 wherein said circumferential surface is a cylindrical surface of substantially constant radius having an axis, said axis of said circumferential surface being coincident with said drum axis.

13. A drive as claimed in claim 11, wherein said other one of said members is mounted for sliding movement relative to said base.

14. A drive as claimed in claim 11, wherein said one of said members is said first member, said second member is mounted for pivotal movement relative to said base about a second axis, said second member having a circumferential surface remote from said second axis, said second portion connecting means connecting said tape to said second member so that upon pivotal movement of said second member about said second axis, said tape will be wound onto or off of said second member circumferential surface with one of said plies confronting said second member circumferential surface.

15. A drive as claimed in claim 14, wherein the radius of curvature of said second member circumferential surface about said second axis differs from the radius of curvature of said drum circumferential surface about said drum axis.

16. A drive as claimed in claim 11 wherein the radius of curvature of said circumferential surface about said drum axis is different for different regions of said drum circumferential surface.

17. A drive as claimed in claim 11 further comprising a second tape having first and second portions, second tape portion connecting means for connecting the first portion of said second tape to said first member and the second portion of said second tape to said second member so that movement of said first member relative to said base in either direction will be transmitted to said second member through one of said tapes.

18. A drive as claimed in claim 1 wherein said bights at said second portion of said tape are concentric with one another and said plies in each said run are parallel with one another throughout a second portion region of said tape from said active region to said bights.

19. A drive as claimed in claim 18 wherein said bights at said second portion are contiguous with one another and the plies in each said runs are contiguous with one another throughout said active region and said second portion region.

20. A drive as claimed in claim 1 further comprising a pair of opposed tracking elements mounted to said second member and engaging both of said runs therebetween.

21. A drive as claimed in claim 1, further comprising a base, said first and second members being movably mounted to said base, said means for defining a curved surface including a guide member fixed to said base and defining a curved guide surface, said tape engaging said curved guide surface so that said active region of said tape moves off of and onto said curved guide surface as said members move relative to said base.

22. A drive as claimed in claim 21, further comprising a second tape having first and second portions, said second tape extending between said members, the drive also including second tape portion connecting means for connecting said first and second portions of said second tape of said members, said second tape also being engaged with said curved guide surface so that an active region of said second tape moves off of and onto said curved guide surface as said members move relatively to one another, said first and second tapes extending from said first member to said second member in opposite directions around said guide member.

23. A drive as claimed in claim 22, further comprising an elongated buffer strip extending from one of said members, around said curved guide member and back to said one of said members, said buffer strip being connected to said one of said members but not to the other one of said members.

24. A drive as claimed in claim 22, further comprising intermediate rollers rotatably mounted to said base at opposite ends of said curved guide surface, each of said tapes extending from said curved guide surface around one of said rollers to one of said members.

25. A drive as claimed in claim 1, wherein each said strap is metallic.

26. A drive as claimed in claim 25, wherein each said strap is less than about 0.015" thick.

27. A drive as claimed in claim 25 wherein each said strap is less than about 0.002" thick.

28. A drive comprising:
(a) a base;
(b) first and second members movable with respect to said base;
(c) a tape comprising a plurality of superposed, flexible but substantially inextensible strip-like plies, said tape having a first portion, a second portion, a longitudinal direction extending between said portions, said tape including a plurality of straps, each strap being folded upon itself and defining two of said plies and a bight at said second portion of said tape whereby said plies define a medial surface such that one ply defined by each strap lies on each side of said medial surface;
(d) first portion connecting means and second portion connecting means for connecting said first portion and said second portion to said first and second members respectively, so that said members are linked to all of said plies for transmission of forces therebetween, said second portion connecting means including equalizing means for permitting longitudinal movement of said plies relative to one another, said equalizing means including an equalizing post connected to said second member, said bights extending around said equalizing post, said bights being contiguous and superposed upon one another on said equalizing post.

29. A drive as claimed in claim 28 wherein those of said plies on each side of said medial surface are contiguous with one another throughout the length of said tape.

* * * * *

UNITED STATES PATENT AND TRADEMARK OFFICE
CERTIFICATE OF CORRECTION

PATENT NO. : 4,813,292

DATED : March 21, 1989

INVENTOR(S) : James G. Boyko

It is certified that error appears in the above-identified patent and that said Letters Patent is hereby corrected as shown below:

Column 1, line 62, "tapes" should read --tape--.

Column 4, line 29, "of" should read --or--.

Column 10, line 59, "432" should read --431--.

Column 11, line 50, "extens" should read --extends--.

Column 12, line 1, "curves" should read --curved--.

Column 14, line 34, after "tending" insert --to--.

Column 16, line 15, "impeded" should read --impede--.

Column 17, line 23, "contribute" should read --constitute--.

Column 19, line 47, "of" should read --to--.

Column 19, lines 50 and 51, "relatively" should read --relative--.

Signed and Sealed this

Fourteenth Day of November, 1989

*Attest:*

JEFFREY M. SAMUELS

*Attesting Officer*   *Acting Commissioner of Patents and Trademarks*